United States Patent
Cao et al.

(10) Patent No.: US 9,740,683 B2
(45) Date of Patent: *Aug. 22, 2017

(54) DISAMBIGUATION IN CONCEPT IDENTIFICATION

(71) Applicant: INTERNATIONAL BUSINESS MACHINES CORPORATION, Armonk, NY (US)

(72) Inventors: Feng Cao, Shanghai (CN); Yuan Ni, Shanghai (CN); Qiong Kai Xu, Shanghai (CN); Hui Jia Zhu, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/953,468

(22) Filed: Nov. 30, 2015

(65) Prior Publication Data

US 2016/0371587 A1 Dec. 22, 2016

Related U.S. Application Data

(63) Continuation of application No. 14/740,585, filed on Jun. 16, 2015.

(51) Int. Cl.
*G06F 17/27* (2006.01)
*G06F 17/30* (2006.01)
*G06N 5/02* (2006.01)
*G06N 7/00* (2006.01)

(52) U.S. Cl.
CPC ........ *G06F 17/2785* (2013.01); *G06F 17/278* (2013.01); *G06F 17/2715* (2013.01); *G06F 17/30734* (2013.01); *G06N 5/022* (2013.01); *G06N 7/005* (2013.01)

(58) Field of Classification Search
CPC ............ G06F 21/6209; G06F 21/6218; H04L 63/0428; H04L 63/105; G06Q 10/10
USPC .......................................................... 704/9
See application file for complete search history.

(56) References Cited

U.S. PATENT DOCUMENTS 7,925,610 B2 * 4/2011 Elbaz ................ G06F 17/30616
706/55

OTHER PUBLICATIONS

Feng Cao, et al., "Disambiguation in Concept Identification", U.S. Appl. No. 14/740,585, filed Jun. 16, 2015.
List of IBM Patents or Patent Applications Treated as Related; (Appendix P), Filed Jan. 18, 2016; 2 pages.

* cited by examiner

*Primary Examiner* — Charlotte M Baker
(74) *Attorney, Agent, or Firm* — Cantor Colburn LLP; Alexa Ashworth

(57) ABSTRACT

A method, a disambiguation decoder and a system is provided for disambiguation in concept identification. A set of candidate concepts of a surface form in a sequence of surface forms in a plaintext is obtained. First probabilities for the candidate concepts are then determined, wherein a first probability indicates likelihood that the surface form represents the respective candidate concept. One of the candidate concepts is selected for the surface form based on the first probabilities and adjacency of the surface forms in the sequence.

6 Claims, 6 Drawing Sheets

DISAMBIGUATION IN CONCEPT IDENTIFICATION

DOMESTIC PRIORITY

This application is a continuation of U.S. Non-Provisional application Ser. No. 14/740,585, entitled "DISAMBIGUATION IN CONCEPT IDENTIFICATION", filed Jun. 16, 2015, which is incorporated herein by reference in its entirety.

BACKGROUND

Concept identification, which is also referred to as mention detection, is a process that identifies concepts contained in plaintext. As used herein, a concept refers to an item or entry which has a definite meaning in a dictionary such as a web-based encyclopedia. Examples of a concept may include, but are not limited to, a person such as "Michael Jordan", an organization such as "International Business Machines", an activity such as "Presidential Election 2000," and the like. The concepts identified from the plaintext can be linked to their respective articles or webpages that contain the correct meanings thereof. For instance, if the concept "Michael Jordan" is identified in a plaintext, then this phrase can be linked via a hyperlink to a webpage that introduces the former basketball player Michael Jordan.

Disambiguation is an important stage of concept identification. It would be appreciated that a concept may be represented by different surface forms. As used herein, a surface form is a sequence of words that represent a concept. For instance, examples of the surface form for the concept "Michael Jordan" may include "Jordan," "Michael," "Air Jordan," "MJ," and the like. On the other hand, the different concepts may have the same surface forms. That is, a surface form might be used to represent different concepts. For example, the surface form "MJ" may represent "Michael Jordan" or "Michel Jackson." The disambiguation is to determine the exact concept to which a detected surface form refers in the context of the given plaintext.

SUMMARY

In general, example embodiments of the present invention include a method, device and computer program product for disambiguation in concept identification.

In an aspect, embodiments of the present invention provide a computer-implemented method. The method comprises obtaining a set of candidate concepts of a surface form in a sequence of surface forms in a plaintext. The method further comprises determining first probabilities for the candidate concepts, a first probability indicating likelihood that the surface form represents the respective candidate concept. Based on the first probabilities and adjacency of the surface forms in the sequence, one of the candidate concepts is selected for the surface form.

In another aspect, embodiments of the present invention provide a device. The device includes a processor and a tangible storage medium. The tangible storage medium has modules of a disambiguation decoder stored thereon for execution by the processor. The modules include a candidate concept obtaining module, a first probability determining module and a concept selecting module. The candidate concept obtaining module is configured to obtain a set of candidate concepts of a surface form in a sequence of surface forms in a plaintext. The first probability determining module configured to determine first probabilities for the candidate concepts, where a first probability indicates likelihood that the surface form represents the respective candidate concept. The concept selecting module configured to select one of the candidate concepts for the surface form based on the first probabilities and adjacency of the surface forms in the sequence.

In yet another aspect, embodiments of the present invention provide a system comprises a spotter and a disambiguation decoder. The spotter is configured to generate a sequence of surface form from a plaintext based on a predetermined surface form dictionary. The disambiguation decoder is configured to, for each of the surface forms, obtain a set of candidate concepts from a knowledge base. The disambiguation decoder is further configured to determine first probabilities for the candidate concepts from the knowledge base, a first probability indicating likelihood that the surface form represents the respective candidate concept, and to select one of the candidate concepts for the surface form based on the first probabilities and adjacency of the surface forms in the sequence.

It is to be understood that the Summary is not intended to identify key or essential features of embodiments of the present invention, nor is it intended to be used to limit the scope of the present invention. Other features of the present invention will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Principles of the present invention will now be described with reference to some example embodiments. It is to be understood that these embodiments are described only for the purpose of illustration and help those skilled in the art to understand and implement the present invention, without suggesting any limitations as to the scope of the invention. The invention described herein can be implemented in various manners other than the ones describe below.

As used herein, the term "includes" and its variants are to be read as opened terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
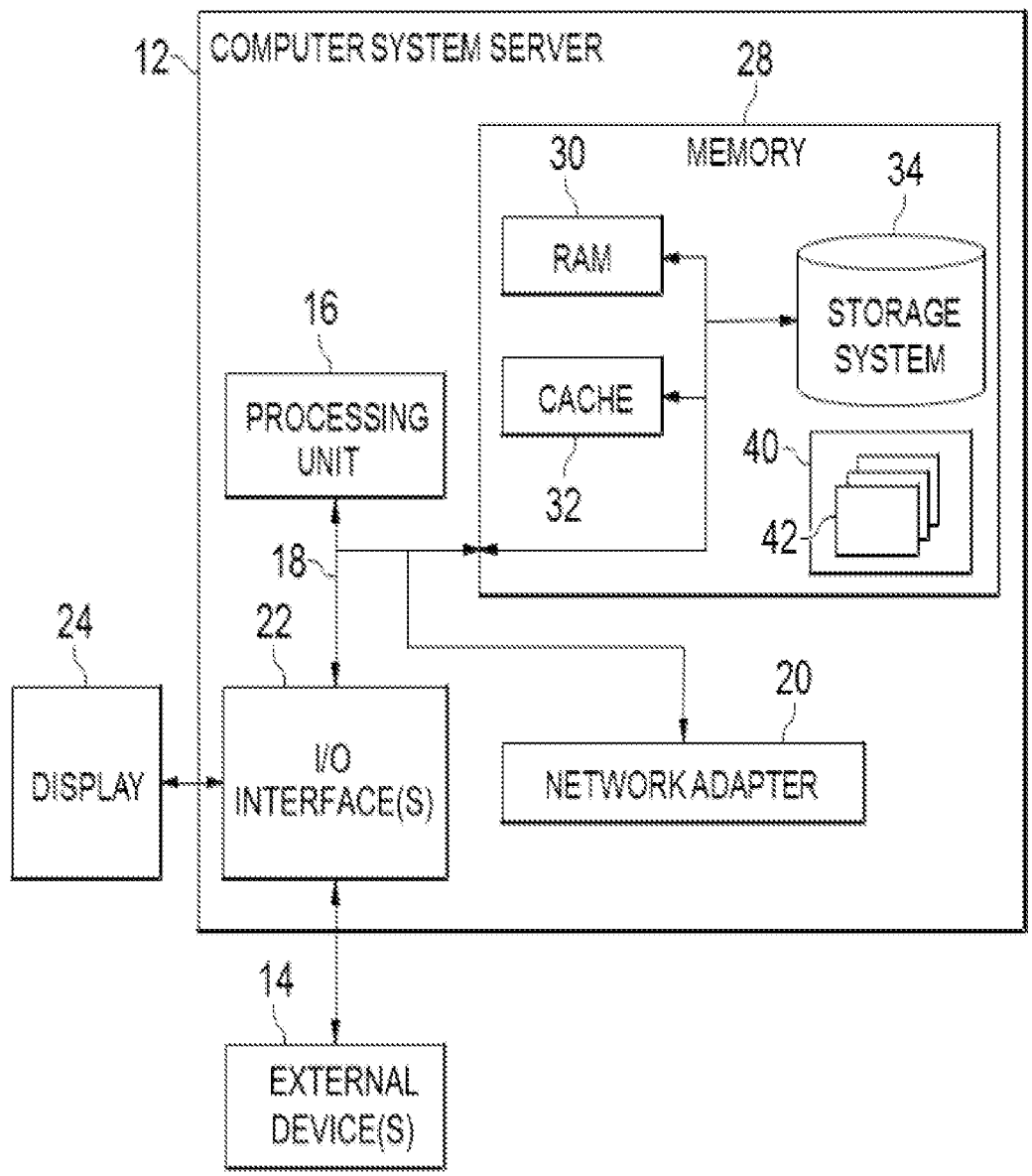
FIG. 1 is a block diagram of an electronic device in which embodiments of the present invention can be implemented.

Reference is first made to FIG. 1, in which an exemplary electronic device or computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, and the like. One or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, and the like.

In computer system/server 12, I/O interfaces 22 may support one or more of various different input devices that can be used to provide input to computer system/server 12. For example, the input device(s) may include a user device such keyboard, keypad, touch pad, trackball, and the like. The input device(s) may implement one or more natural user interface techniques, such as speech recognition, touch and stylus recognition, recognition of gestures in contact with the input device(s) and adjacent to the input device(s), recognition of air gestures, head and eye tracking, voice and speech recognition, sensing user brain activity, and machine intelligence.

Some example embodiments of disambiguation in concept identification will now be described. In general, according to embodiments of the present invention, not only the prior probability for candidate concepts but also the adjacency of surface forms in the plaintext is taken into consideration in disambiguation. The adjacency of surface form in turn reflects the adjacency of candidate concepts of the surface forms. By using the context information provided by the adjacency of the candidate concepts instead of processing the surface forms separately, the accuracy of disambiguation can be significantly improved. Moreover, it would be appreciated that according to embodiments of the present invention, the disambiguation is done based on the concept-based context rather than the word-based context. That is, instead of considering the adjacency of every word in the plaintext, only the surface forms are used to provide context information. By excluding those words other than the surface forms, the accuracy of disambiguation is improved while the dimension of features to be processed is reduced.

Figure 2:
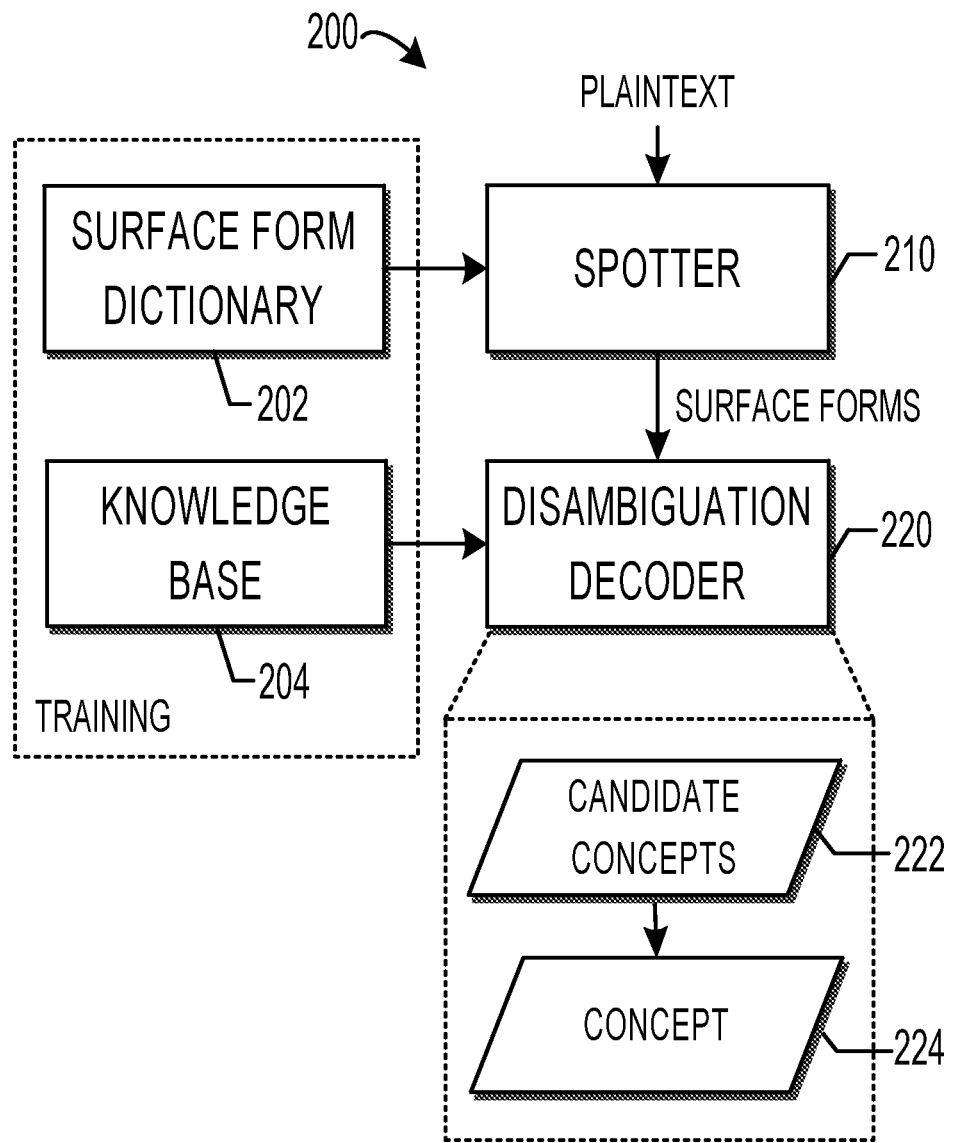
FIG. 2 is an environment in which the embodiments of the present invention can be implemented.

FIG. 2 shows a block diagram of an environment 200 for concept disambiguation in accordance with embodiments of the present invention. As shown, the environment 200 includes a disambiguation system comprising a spotter 210 and a disambiguation decoder 220. The spotter 210 is configured to receive a plaintext and analyze the words in the plaintext to generate a sequence of surface forms. As used herein, a surface form includes one or more words and is expected to be a mention of a concept. The spotter 210 provides the resulting sequence of surface forms to the disambiguation decoder 220. For each surface form, the disambiguation decoder 220 determines a list of candidate concepts and then selects one candidate concept from the list as the concept for the surface form in the current plaintext.

The environment 200 also includes a surface form dictionary 202 and a knowledge base 204. The surface form dictionary 202 and the knowledge base 204 are generated in advance based on the training data such as articles or documents, for example. The surface form dictionary 202 includes a list of surface forms that can be used to mention the respective concepts. The surface forms listed in the surface form dictionary 202 may be obtained in training phase. For example, the surface form dictionary 202 may be generated by automatic data processing and/or manual labeling on training data. In operation, the spotter 210 analyzes the input plaintext with reference to the surface form dictionary 202 and generates a sequence of surface form in the plaintext. Any suitable spotting technologies, either currently known or to be developed in the future, can be used in connection with embodiments of the present invention.

The knowledge base 204 includes knowledge about the associations between the surface forms and the possible candidate concepts. The knowledge base 204 further includes knowledge about probabilities that a given surface form represents the respective concepts and knowledge about transition probabilities among the concepts, which will be detailed below. In operation, the disambiguation decoder 220 retrieves the knowledge from the knowledge base 204 and disambiguates the surface forms provided by the spotter 210 using the retrieved knowledge.

It is to be understood that the environment 200 is described only for the purpose of illustration, without suggesting any limitation as to the scope of the present invention. Embodiments of the present invention can be implemented in any other suitable environment with fewer, additional and/or alternative components. Operations, functionalities and other features of the components shown in FIG. 2 will now be described in further detail.

As described above, each surface form is composed of one or more words and is expected to mention a concept. Different surface forms can be used to mention the same concept. For example, the surface forms "Michael Jordan" and "Air Jordan" may both refer to the concept "Michael Jeffrey Jordan". On the other hand, a single surface form might be used to represent different concepts in different scenarios. For example, the surface form "MJ" may represent either "Michael Jeffrey Jordan" or "Michael Joseph Jackson."

In order to determine the exact concept of each surface form resulting from the spotting, in accordance with embodiments of the present invention, the adjacency of the surface forms is utilized by the disambiguation decoder 220. More specifically, the surface forms obtained by the spotter 210 are provided to the disambiguation decoder 220 in order. That is, the disambiguation decoder 220 knows not only the surface forms but also their adjacency. As such, the disambiguation decoder 220 is able to make use of the adjacency of the candidate concepts of the surface forms.

Figure 3:
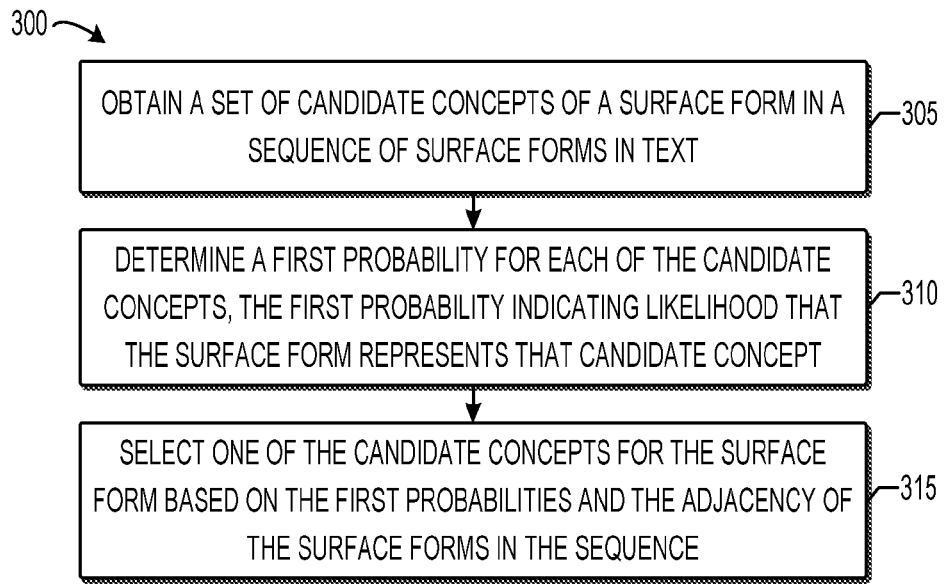
FIG. 3 is a flowchart of a process for disambiguation in concept identification in accordance with embodiments of the present invention.

FIG. 3 shows a flowchart of a method 300 for disambiguation in concept identification in accordance with embodiments of the present invention. The method 300 may be implemented at the disambiguation decoder 220. For each of the surface forms, the disambiguation decoder 220 may determine the concept that the surface form mentions by applying the method 300.

The method 300 begins at block 305, where a set of candidate concepts of the surface form being disambiguated is obtained. In block 305, the disambiguation decoder 220 may access the knowledge base 204 to retrieve the knowledge about the associations between the surface forms and the candidate concepts thereof. For any given surface form, such knowledge indicates one or more candidate concepts to which the surface form might refer. For instance, examples of the candidate concepts for the surface form "Bush" include, but are not limited to, "George H. W. Bush," "George Walker Bush," "bush wood," and the like. Based on the knowledge retrieved from the knowledge base 204, the disambiguation decoder 220 may obtain the candidate concepts 222 of the surface form being processed.

Then the method 300 proceeds to block 310, where a probability for each of the candidate concepts is determined. For the sake of discussion, the probability determined in block 310 is referred to as the "first probability." For each candidate concept, the first probability indicates the likelihood that the surface form represents that candidate concept. That is, the first probability is a "surface form to concept" probability.

Still considering the example where the surface form is "Bush," it is supposed that in the training data, forty percent (40%) of the surface forms "Bush" refer to the concept "George H. W. Bush," fifty percent (50%) of the surface forms "Bush" refer to the concept "George Walker Bush," and ten percent (10%) of the surface forms "Bush" refer to the concept "bush wood." As such, for the surface form "Bush," the first probabilities for the candidate concepts "George H. W. Bush," "George Walker Bush" and "bush wood" are 40%, 50% and 10%, respectively.

In accordance with embodiments of the present invention, the first probabilities for various surface forms and their candidate concepts are obtained and stored in the knowledge base 204 in advance. In block 310, the disambiguation decoder 220 may query the knowledge base 204 and determine the first probability for each candidate concept of the surface form being processed based on the knowledge retrieved from the knowledge base 204.

Next, in block 315, one of the candidate concepts is selected from the candidate concepts 222 as the concept 224 of the surface form being processed. In accordance with embodiments of the present invention, the concept 224 is selected based upon not only the first probabilities for the candidate concepts as determined in block 310, but also the adjacency of the surface form being processed and other surface forms in the sequence. Therefore, the adjacency of the candidate concepts of the surface forms can be utilized in disambiguation.

Figure 4:
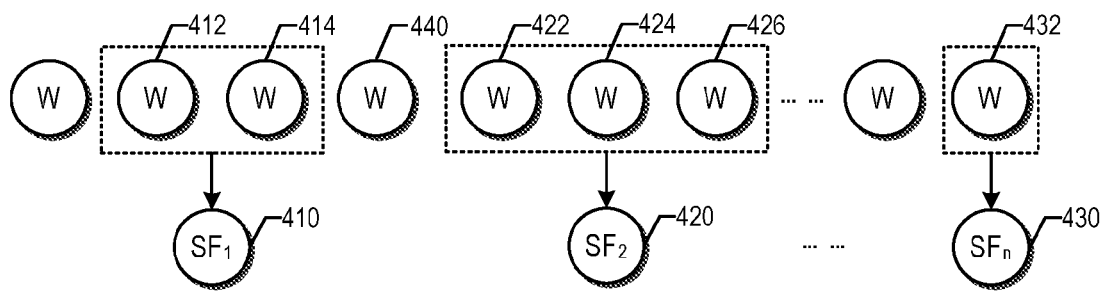
FIG. 4 is a schematic diagram of the surface forms output by the spotter in accordance with embodiments of the present invention.

As described above, the spotter 210 provides the disambiguation decoder 220 with a sequence of surface forms in order. FIG. 4 shows a schematic diagram of the surface forms obtained by the spotter 210. In this example, the surface form 410 is composed of words 412 and 414, the surface form 420 is composed of words 422, 424 and 426, and the surface form 430 is composed of word 432. This sequence of surface forms is provided to the disambiguation decoder 220, where the (i+1)-th surface form in the plaintext is provided immediately after the i-th surface form in the plaintext.

The adjacency of candidate concepts of the surface forms provides useful and meaningful context to the disambiguation. In general, for any two concepts, one concept is mentioned after the other with a certain probability. Such probability for a concept can be considered as a transition probability given a preceding concept. For example, the probability that the concept "Michael Jeffery Jordan" is mentioned after another concept "National Basketball Association" is quite high, while the concept "Michael Joseph Jackson" is mentioned after the concept "National Basketball Association" is relatively low. By taking the transition probability into account, it is possible to accurately disambiguate the surface forms in the specific context of the plaintext.

Still considering the above example, it is supposed that for the surface form "MJ," there are two candidate concepts "Michael Jeffery Jordan" and "Michael Joseph Jackson"

with the first probabilities for 45% and 55%, respectively. It is further supposed that the probability that the concept "Michael Jeffery Jordan" is mentioned after the concept "National Basketball Association" is 95%, while the probability that concept "Michael Joseph Jackson" is mentioned after the concept "National Basketball Association" is 5%. In this event, if a surface form "MJ" appears immediately after a surface form "NBA" and if the preceding surface form "NBA" is determined to represent the concept "National Basketball Association," then the surface form "MJ" is very likely to represent the concept "Michael Jeffery Jordan" rather than "Michael Joseph Jackson."

Mathematically, given a sequence of surface forms $s_1, s_2, \ldots, s_n$, the concepts $c_1, c_2, \ldots, c_n$ may be determined in such a way that the following overall transition probability is maximized:

$P(c_1, c_2, \ldots, c_n | s_1, s_2, \ldots, s_n)$.

This can be achieved in many different ways and the example embodiments will be discussed in the following paragraphs.

Particularly, it would be appreciated that in accordance with embodiments of the present invention, the context information used by the disambiguation decoder 220 in disambiguation is constructed without taking into the account any word that is not included in a surface form. That is, only the adjacency of the surface forms is considered while the other words are not. For instance, in the example shown in FIG. 4, the word 440 between the last word 414 of the surface form 410 and the first word 422 of the surface form 420 is not considered in disambiguation. This would be beneficial to the disambiguation accuracy because many words such as articles, prepositions are not meaningful to the selection of candidate concepts. By excluding those words other than the surface forms, the potential noises in disambiguation can be reduced or eliminated. In addition, by reducing the dimension of features to be processed, the processing efficiency will be improved.

Figure 5:
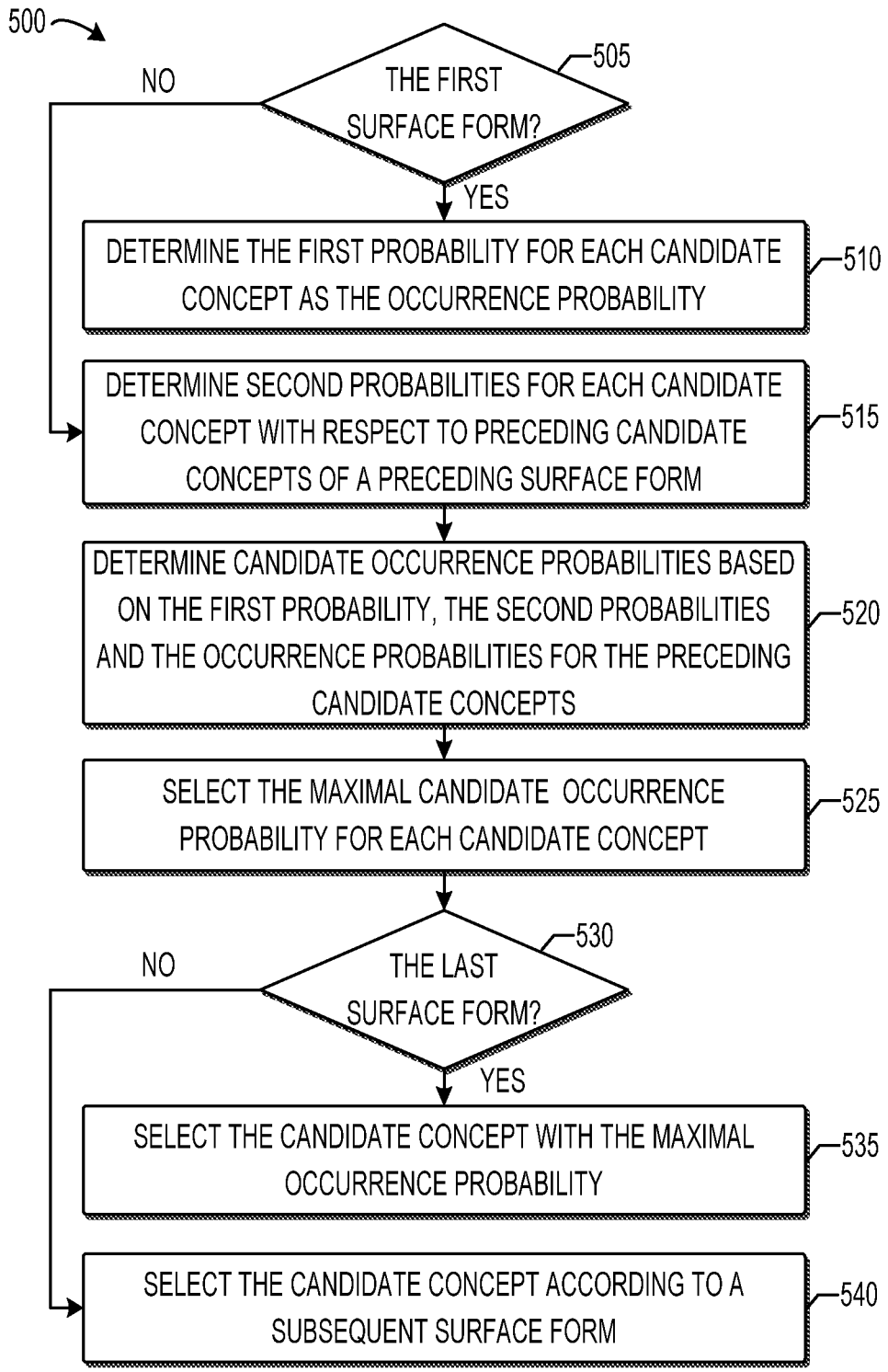
FIG. 5 is a flowchart of a method for selecting one of the candidate concepts for a surface form in accordance with embodiments of the present invention.

Now some example embodiments of the candidate concept selection will be described. FIG. 5 shows a flowchart of a method 500 for selecting one of the candidate concepts for a given surface form in accordance with embodiments of the present invention. The method 500 can be considered as an example implementation of block 315 in the method 300.

According to the method 500, the occurrence probability for each candidate concept of the surface form is first determined. As used herein, an occurrence probability for a candidate concept indicates likelihood that the candidate concept is mentioned in the current plaintext. In some embodiments, the occurrence probability may be determined based on the first probability for the candidate concept and the adjacency of the surface forms in the sequence.

Figure 6:
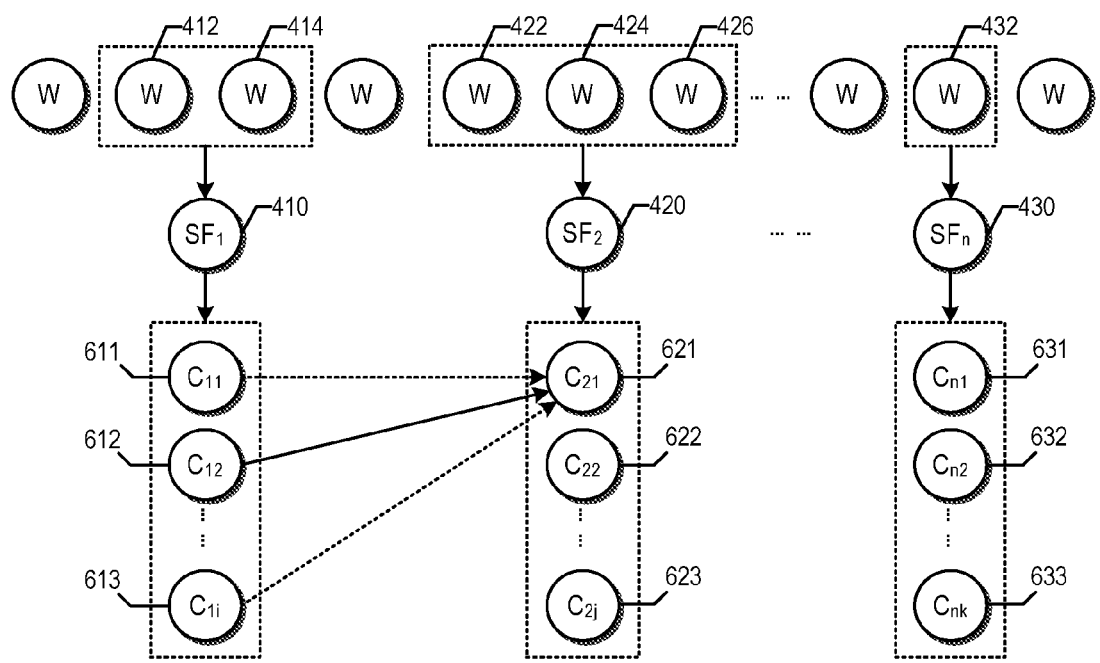
FIG. 6 is a schematic diagram of the surface forms, their candidate concepts and the concept selection in accordance with embodiments of the present invention.

More specifically, in decision block 505, it is determined whether the surface form being processed is the first one in the sequence of surface forms. If so, the method 500 proceeds to block 510, where the first probability for the candidate concept (which is determined in block 310 of the method 300) is determined as the occurrence probability. That is, since the first surface form has no preceding surface form, the natural occurrence probability (the first probability) can act as the occurrence probability in the current plaintext. With reference to FIG. 6, in this example, the surface form 410 is first surface form in the sequence. Therefore, for each of the candidate concepts 611, 612 and 613, the first probability is directly used as the occurrence probability.

On the other hand, if it is determined in decision block 505 that the surface form being processed is not the first surface form in the sequence, the method 500 proceeds to block 515. In block 515, for each candidate concept of the surface form, transition probabilities with respect to preceding candidate concepts of a preceding surface form is determined. For the sake of discussion, the transition probabilities are referred to as "second probabilities." A second probability indicates likelihood that the current candidate concept is mentioned after the respective preceding candidate concept.

In general, for a given surface form q that is not the first one in the sequence, a set of second probabilities can be obtained for each candidate concept $c_{qx}$ of the surface form q, as follows:

$\{P(c_{qx}|c_{p1}), P(c_{qx}|c_{p2}), \ldots, P(c_{qx}|c_{py})\}$ where $c_{p1}, c_{p2}, \ldots, c_{py}$ represent the candidate concepts of a preceding surface form p before the surface form q. For instance, in the example shown in FIG. 6, the surface form 420 is not the first surface form and has a preceding surface form 410. For the candidate concept 621 of the surface form 420, a set of second probabilities with respect to the preceding candidate concepts $c_{11}, c_{12}, \ldots, c_{1i}$ (i is a natural number) of the preceding surface form 410 may be determined:

$\{P(c_{21}|c_{11}), P(c_{21}|c_{12}), \ldots, P(c_{21}|c_{1i})\}$

The values of those transition probabilities may be obtained in the training phrase and stored in the knowledge base 204, for example. In block 515, the disambiguation decoder 220 may access the knowledge base 204 to retrieve the probability values. Likewise, the second probabilities for the other candidate concepts 622 and 623 of the surface form 420 can be determined.

Particularly, in the above example, only one preceding surface form that is immediately prior to the current surface form is considered. In some alternative embodiments, it is also possible to use any suitable number of preceding surface forms prior to the surface form being processed.

The method 500 then proceeds to block 520. In block 520, for each candidate concept, a set of candidate occurrence probabilities is determined based on the first probability and the second probabilities for the current candidate concept as well as the occurrence probabilities for the preceding candidate concepts of the preceding surface form. For a given surface form q that is not the first one in the sequence, the candidate occurrence probability for a candidate concept $c_{qx}$ with respect to a preceding candidate concept $c_{py}$ of a preceding surface form p may be calculated as follows:

$P_{qx}^{(py)} = P_{py} \cdot P(c_{qx}|c_{py}) \cdot P_{qx}^*$ where $P_{py}$ represents the occurrence probability for the preceding candidate concept $c_{py}$, $P(c_{qx}|c_{py})$ represents the second probability that the current candidate concept $c_{qx}$ is mentioned after the preceding candidate concept $c_{py}$, and $P_{qx}^*$ represents the first probability (surface-form-to-concept probability) of the current candidate concept $c_{qx}$.

Still consider the example shown in FIG. 6, a candidate occurrence probability for the candidate concept 621 of the current surface form 420 with respect to the preceding candidate concept 611 of the preceding surface form 410 may be calculated as follows:

$P_{21}^{(11)} = P_{11} \cdot P(c_{21}|c_{11}) \cdot P_{21}^*$ where $P_{11}$ represents the occurrence probability for the preceding candidate concept 611, $P(c_{21}|c_{11})$ represents the second probability that the current candidate concept 621 is mentioned after the preceding candidate concept 611, and $P^*_{21}$ represents the first probability (surface-form-to-concept probability) of the current candidate concept 621. Likewise, the candidate occurrence probabilities for the candidate concept 621 of the current surface form 420 with respect to the preceding candidate concepts 612-613 of the preceding surface form 410 can be determined. In this way, a set of candidate occurrence probabilities $\{P_{21}^{(11)}, P_{21}^{(12)}, \ldots, P_{21}^{(1i)}\}$ is obtained for the candidate concept 621. The candidate occurrence probabilities for the other candidate concepts 622-623 of the surface form 420 may be obtained in a similar way.

Then in block 525, for each candidate concept, the maximal candidate occurrence probability is selected as the occurrence probability for that candidate concept. In general, for a given surface form q that is not the first one in the sequence, the occurrence probability for a candidate concept $c_{qx}$ may be determined as follows:

$$P_{qx} = \max\{P_{qx}^{(p1)}, P_{qx}^{(p2)}, \ldots, P_{qx}^{(pn)}\}$$

where $P_{qx}^{(p1)}, P_{qx}^{(p2)}, \ldots, P_{qx}^{(pn)}$ represent the candidate occurrence probabilities for the candidate concept $c_{qx}$ with respect to the preceding candidate concepts $c_{p1}, c_{p2}, \ldots, c_{pn}$ of a preceding surface form p. For instance, in the example shown in FIG. 6, the occurrence probability for the candidate concept 621 may be determined as follows:

$$P_{21} = \max\{P_{21}^{(11)}, P_{21}^{(12)}, \ldots, P_{21}^{(1i)}\}$$

It would be appreciated that in accordance with embodiments of the present invention, the occurrence probabilities for the candidate concepts may be determined according to the order of the surface forms in the sequence. For instance, in the example shown in FIG. 6, the occurrence probabilities for the candidate concepts 611-613 of the surface form 410 are first determined directly based on the first probabilities, as described above. Then the occurrence probabilities for the candidate concepts 621-623 of the surface form 420 are determined, and so on. This is repeated until the occurrence probabilities for the candidate concepts 631-633 of the last surface form 430 are determined.

In addition, by determining the occurrence probability as described above, each candidate concept is associated with a preceding candidate concept of the preceding surface form. In the example shown in FIG. 6, it is supposed that the candidate occurrence probability $P_{21}^{(12)}$ is the maximal one among $\{P_{21}^{(11)}, P_{21}^{(12)}, \ldots, P_{21}^{(1i)}\}$ and therefore is determined as the occurrence probability for the candidate concept 621. In this case, the candidate concept 621 is associated with the preceding candidate concept 612. In some embodiments, such associations between the adjacent candidate concepts may be used in later stage in the disambiguation, which will be further discussed in the following paragraphs.

After the occurrence probabilities are determined for the candidate concepts of all surface forms in the sequence, for each surface form, one of the candidate concepts may be selected based on the occurrence probabilities. Once again, the selection of candidate concepts is done based upon the adjacency of the surface forms in the sequence. Still in reference to FIG. 5, it is determined in decision block 530 whether the surface form being processed is the last surface form in the sequence.

If the current surface form is determined to be the last surface form, in one embodiment, the candidate concept with the maximal occurrence probability is selected in block 535 to act as the concept of the last surface form. For instance, in the example shown in FIG. 6, for the last surface form 430, it is supposed that the occurrence probability for the candidate concept 631 is greater than the occurrence probabilities for the other candidate concepts 632-633. In this case, the candidate concept 631 is selected as the concept of the surface form 430.

If it is determined in decision block 530 that the surface form being processed is not the last surface form (and therefore has a subsequent surface form), then the method 500 proceeds to block 540. In block 540, one of the candidate concepts of the current surface form is selected according to the occurrence probability for the selected candidate concept of a subsequent surface form. More specifically, in block 540, the candidate concept of the current surface form that is associated with the selected concept of the subsequent surface form is selected as the concept of the current surface form.

For instance, in the example shown in FIG. 6, it is supposed that the surface form being processed is the first surface form 410 and that the candidate concept 621 is selected for the subsequent surface form 420. In this event, if the candidate occurrence probability $P_{21}^{(12)}$ is determined as the occurrence probability for the candidate concept 621, the candidate concept 612 is associated with the candidate concept 621, as described above. Accordingly, the candidate concept 612 is selected for the current surface form 410.

It would be appreciated that the disambiguation in blocks 535 and 540 is done according to the reversed order of the surface forms in the sequence. For instance, in the example shown in FIG. 6, the concept of the last surface form 430 is first determined. Then the concept of the surface form immediately prior to the surface form 430 is determined, and so on. After the concept of the surface form 420 is determined, the concept of the first surface form 410 is determined to complete the disambiguation.

In the embodiments discussed with reference to FIG. 5, the disambiguation is done according to a dynamic programming strategy. In alternative embodiments, any other suitable strategies may be adopted. For example, in one embodiment, the greedy algorithm can be used. In such embodiment, the disambiguation starts from the first surface form in the sequence, where the candidate concept with the maximal occurrence probability is selected. Then the disambiguation continues according to the associations between the candidate concepts of the adjacent surface forms.

It will be appreciated that given the teaching of the present disclosure, a variety of modifications or variations are possible. For example, in the embodiments discussed above, the sequence of surface forms is constructed according to the order in which the surface forms appear in the plaintext. In alternative embodiments, the sequence can be constructed according to the reversed order in which the surface forms appear in the plaintext. For instance, in the example shown in FIG. 4, the sequence to be processed by the disambiguation decoder 220 may be the surface forms 430, ..., 420 and 410.

Figure 7:
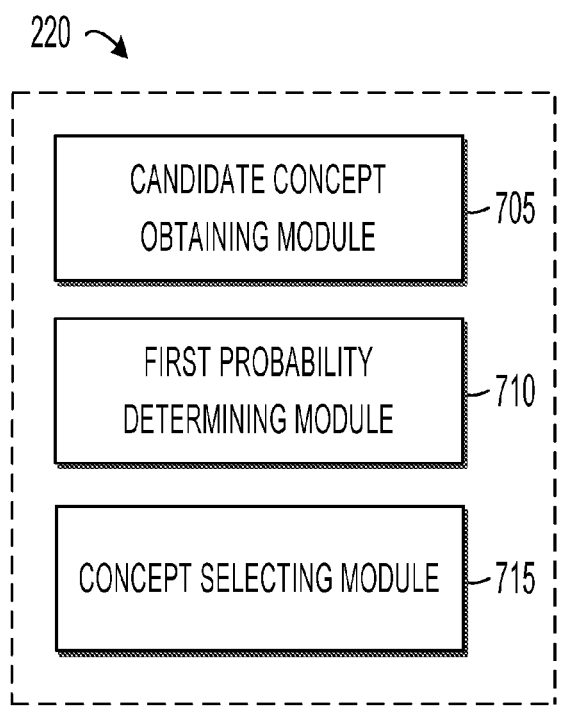
FIG. 7 is a block diagram of the disambiguation decoder in accordance with embodiments of the present invention.

FIG. 7 illustrates a block diagram of the disambiguation decoder 220 in some embodiments of the present invention. It is to be understood that the structure shown in FIG. 7 is just an example implementation of the disambiguation decoder 220, without suggesting any limitation as to the scope of the present invention. The disambiguation decoder 220 may be embodied in any other suitable ways.

In the embodiments shown in FIG. 7, the disambiguation decoder 220 includes a candidate concept obtaining module 705 configured to obtain a set of candidate concepts of a surface form in a sequence of surface forms in a plaintext; a first probability determining module 710 configured to determine first probabilities for the candidate concepts, a first probability indicating likelihood that the surface form represents the respective candidate concept; and a concept selecting module 715 configured to select one of the candidate concepts for the surface form based on the first probabilities and adjacency of the surface forms in the sequence.

In some embodiments, the disambiguation decoder 220 further comprises an occurrence probability determining module configured to determine occurrence probabilities for the candidate concepts based on the first probabilities and the adjacency of the surface forms in the sequence, an occurrence probability indicating likelihood that the respective candidate concept is mentioned in the plaintext. In such embodiments, the concept selecting module 715 is configured to select one of the candidate concepts for the surface form based on the occurrence probabilities.

In one embodiment, the occurrence probability determining module is configured to determine the first probabilities for the candidate concepts as the occurrence probabilities if the surface form is located at a start of the sequence.

In one embodiment, the occurrence probability determining module is configured to, if the surface form has a preceding surface form in the sequence, for each of the candidate concepts: determine second probabilities with respect to preceding candidate concepts of the preceding surface form, a second probability indicating likelihood that the candidate concept is mentioned after the respective preceding candidate concept; determine candidate occurrence probabilities based on the first probability, the second probabilities, and the occurrence probabilities for the preceding candidate concepts; and select a maximal candidate occurrence probability from among the candidate occurrence probabilities as the occurrence probability.

In one embodiment, the concept selecting module is configured to select a candidate concept with the maximal occurrence probability from the candidate concepts if the surface form is located at an end of the sequence.

In one embodiment, the concept selecting module is configured to, if the surface form has a subsequent surface form in the sequence, select one of the candidate concepts according to the occurrence probability for the selected candidate concept of the subsequent surface form.

The modules shown in FIG. 7 can be implemented by various manners, including software, hardware, firmware or a random combination thereof. For example, in some embodiments, one or more modules can be implemented by software and/or firmware. Alternatively or additionally, the disambiguation decoder 220 can be implemented partially or completely based on hardware. For example, one or more modules in the disambiguation decoder 220 can be implemented as an integrated circuit (IC) chip, an application-specific integrated circuit (ASIC), a system on chip (SOC), a field programmable gate array (FPGA), and the like.

The present invention may be a system, an apparatus, a device, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present invention. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method, comprising:
    obtaining, with a processing device, a set of candidate concepts of a surface form in a sequence of surface forms in a plaintext;
    determining first probabilities for the candidate concepts, a first probability indicating likelihood that the surface form represents the respective candidate concept; and
    selecting one of the candidate concepts for the surface form based on the first probabilities and adjacency of the surface forms in the sequence, wherein selecting one of the candidate concepts for the surface form based on the first probabilities and adjacency of the surface forms in the sequence comprises:
        determining occurrence probabilities for the candidate concepts based on the first probabilities and the adjacency of the surface forms in the sequence, an occurrence probability indicating likelihood that the respective candidate concept is mentioned in the plaintext; and
        selecting one of the candidate concepts for the surface form based on the occurrence probabilities.

2. The method of claim 1, further comprising spotting words in the plaintext to generate the sequence of surface forms.

3. The method of claim 1, wherein determining occurrence probabilities for the candidate concepts comprises responsive to a determination that the surface form is located at a start of the sequence, determining the first probabilities for the candidate concepts as the occurrence probabilities.

4. The method of claim 1, wherein determining occurrence probabilities for the candidate concepts comprises:
    responsive to a determination that the surface form has a preceding surface form in the sequence, for each of the candidate concepts:
    determining second probabilities with respect to preceding candidate concepts of the preceding surface form, a second probability indicating likelihood that the candidate concept is mentioned after the respective preceding candidate concept;
    determining candidate occurrence probabilities based on the occurrence probabilities for the preceding candidate concepts, the first probability and the second probabilities; and
    selecting a maximal candidate occurrence probability from among the candidate occurrence probabilities as the occurrence probability.

5. The method of claim 1, wherein selecting one of the candidate concepts for the surface form based on the occurrence probabilities comprises responsive to a determination that the surface form is located at an end of the sequence, selecting a candidate concept with the maximal occurrence probability from the candidate concepts.

6. The method of claim 1, wherein selecting one of the candidate concepts for the surface form based on the occurrence probabilities comprises responsive to a determination that the surface form has a subsequent surface form in the sequence, selecting one of the candidate concepts according to the occurrence probability for the selected candidate concept of the subsequent surface form.

* * * * *